United States Patent
Shavro

(10) Patent No.: US 10,216,620 B2
(45) Date of Patent: Feb. 26, 2019

(54) STATIC CODE TESTING OF ACTIVE CODE

(71) Applicant: Synopsys, Inc., Mountain View, CA (US)

(72) Inventor: Tamir Shavro, Hertzelia (IL)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 15/202,547

(22) Filed: Jul. 5, 2016

(65) Prior Publication Data

US 2018/0011778 A1   Jan. 11, 2018

(51) Int. Cl.
*G06F 9/44* (2018.01)
*G06F 11/36* (2006.01)

(52) U.S. Cl.
CPC ...... *G06F 11/3676* (2013.01); *G06F 11/3608* (2013.01)

(58) Field of Classification Search
CPC .................................................. G06F 11/3676
USPC .................................................. 717/123–129
See application file for complete search history.

(56) References Cited

U.S. PATENT DOCUMENTS

| | | | | |
|---|---|---|---|---|
| 6,748,583 B2 * | 6/2004 | Aizenbud-Reshef | ..... | G06F 8/34 714/47.3 |
| 6,817,010 B2 * | 11/2004 | Aizenbud-Reshef | ..... | G06F 8/34 714/E11.181 |
| 7,987,456 B2 * | 7/2011 | Mariani | ..... | G06F 8/73 717/143 |
| 8,171,457 B2 * | 5/2012 | Dimpsey | ..... | G06F 11/3476 711/125 |
| 8,332,825 B2 * | 12/2012 | Mital | ..... | G06F 11/3612 714/38.1 |
| 8,495,598 B2 * | 7/2013 | Gounares | ..... | G06F 9/44505 717/140 |
| 8,533,669 B2 * | 9/2013 | King | ..... | G06F 8/41 717/111 |
| 8,561,035 B2 * | 10/2013 | Chicherin | ..... | G06F 9/44505 709/223 |
| 8,661,409 B2 * | 2/2014 | Austin | ..... | G06F 8/34 709/203 |
| 8,838,204 B2 * | 9/2014 | Edelman | ..... | A61B 5/0263 324/309 |
| 8,850,574 B1 * | 9/2014 | Ansel | ..... | G06F 21/53 717/107 |

(Continued)

OTHER PUBLICATIONS

Diep, "Analysis of a Deployed Software", ACM, pp. 595-598, 2007.*

(Continued)

*Primary Examiner* — Anil Khatri
(74) *Attorney, Agent, or Firm* — Fenwick & West LLP

(57) ABSTRACT

A code deployment system deploys code to a set of application systems that execute the application, which may be across several tiers of systems that service requests related to the application. At each system, the application executes and is analyzed during execution to determine active code that is loaded by the application during execution, which may include dynamically-generated code. The active code is then analyzed using static analysis to determine security vulnerabilities and errors in the code that was loaded and operated at each application tier. The active code may also be associated with a specific use case or set of inputs that were applied to the application during the monitoring.

18 Claims, 4 Drawing Sheets

(56) References Cited

U.S. PATENT DOCUMENTS

| | | | | |
|---|---|---|---|---|
| 8,856,725 B1* | 10/2014 | Anderson | ............... | G06F 8/75 |
| | | | | 717/103 |
| 8,954,934 B1* | 2/2015 | Cohen | ............... | G06F 11/3672 |
| | | | | 717/124 |
| 8,954,936 B2* | 2/2015 | Bnayahu | ............... | G06F 8/10 |
| | | | | 717/128 |
| 8,972,956 B2* | 3/2015 | Brownlow | ............... | G06F 8/60 |
| | | | | 717/127 |
| 9,021,447 B2* | 4/2015 | Krajec | ............... | G06F 11/3636 |
| | | | | 717/128 |
| 9,405,555 B2* | 8/2016 | Livshits | ............... | G06F 9/4443 |
| 9,569,341 B1* | 2/2017 | van Schaik | ......... | G06F 11/3672 |

OTHER PUBLICATIONS

Orso, "Monitoring, Analysis, and Testing of Deployed Software", ACM, pp. 263-267, 2010.*

Bowring et al, "Monitoring Deployed Software Using Software Tomography", ACM, pp. 2-9, 2002 (Year: 2002).*

Perkins et al, "Automatically Patching Errors in Deployed Software", ACM, pp. 87-102, 2009 (Year: 2009).*

Bakshy et al, "Designing and Deploying Online Field Experiments", ACM, pp. 283-292, 2014 (Year: 2014).*

Tanter, "Expressive Scoping of Dynamically-Deployed Aspects", ACM, pp. 168-179, 2008 (Year: 2008).*

Munakata et al, "Model-Based Test Case Generation using Symbolic Execution", ACM, pp. 23-28, 2013 (Year: 2013).*

\* cited by examiner

STATIC CODE TESTING OF ACTIVE CODE

BACKGROUND

This invention relates generally to improving software testing, and particularly to runtime selection of code for which to perform static testing.

Software applications written by developers can include various bugs, errors, and other aspects that may be detected via software testing. Testing of software applications can be performed using different methods, primarily "static" testing, referring to tests performed on source or executable code, and dynamic testing, referring to tests performed on the application as the application executes.

In complex application deployments, an application may be deployed by a deployment system, and different portions of an application distributed to different types of systems and servers to perform various dedicated functions for the application. For example, separate systems may provide the frontend and backend to an application.

In performing static analysis of these systems, the code for the application and the different systems may be tested prior to deployment to the various systems. The application may also dynamically generate code or scripts for execution that are not tested. In prior systems, static testing of an application typically required access to a source repository or used application code as it was deployed, without regard to the code that is active during use of the application.

SUMMARY

An application is analyzed by first operating a deployed version of the code and then monitoring the deployed version of the code during execution. At the system executing the deployed code, the execution is monitored to determine active code that is actually loaded and executing, which may include portions of a deployed package of the application, dynamically-linked libraries (e.g., DLLs), packages, individual classes, and so forth. The application may be monitored using breakpoints or by instrumenting the application to add monitoring steps to system or library function calls invoked by the executing code. The monitoring identifies active code executing for the application, identifies test code associated with the active code and provides a copy of the test code for static testing. The test code may include the active code that was monitored, along with other related packages or other data with the active code. For example, the test code may belong in a hierarchy in a distributed application package, and the entire package may be identified and retrieved as the test code. Whenever a module or other portion of code is loaded and active, the related code may be identified as test code for the static analysis. The monitoring may also retrieve dynamically-generated code (e.g., scripts) created as the application executes, permitting analysis of such dynamically-generated code.

For applications distributed to many systems, each system may have a set of modules to monitor and retrieve code associated with the application, such that each system operates an agent to retrieve test code for the portion of the application operating on that system. In an alternate configuration, rather than an agent executing on each system, a remote connection may be established to the system, and the executing application is analyzed using the remote connection. In the remote connection, a testing system queries the operating system of the system on which the application executes and requests executing processes. After identifying running processes, the testing system may identify packages and loaded modules for each process of the application to identify test code. Each system may perform the static analysis on the code for that system, or the systems may report the active code to a central testing location.

During execution of the deployed code, inputs to the deployed code may be automatically provided to simulate a particular use case, such as a user creating a new account, or a user requesting a service from the application. Each use case may be generated by a user connecting to the application, or such inputs may be automatically provided to simulate a user. For each use case, the code may be monitored and the active code that is invoked for that use case may be identified and used for the test code. By monitoring and retrieving active code only for that use case, errors and defects may be more directly determined for that use case, rather than analyzing the entire application without context for a performed action. The use cases may also be combined with dynamic analysis of the application code to profile the performance of the application for particular use cases. In addition, a use case may be analyzed across multiple tiers of the application to identify and test portions of an application that are loaded when a given use case is performed, for example to analyze frontend and backend system tier applications when the use case is performed.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
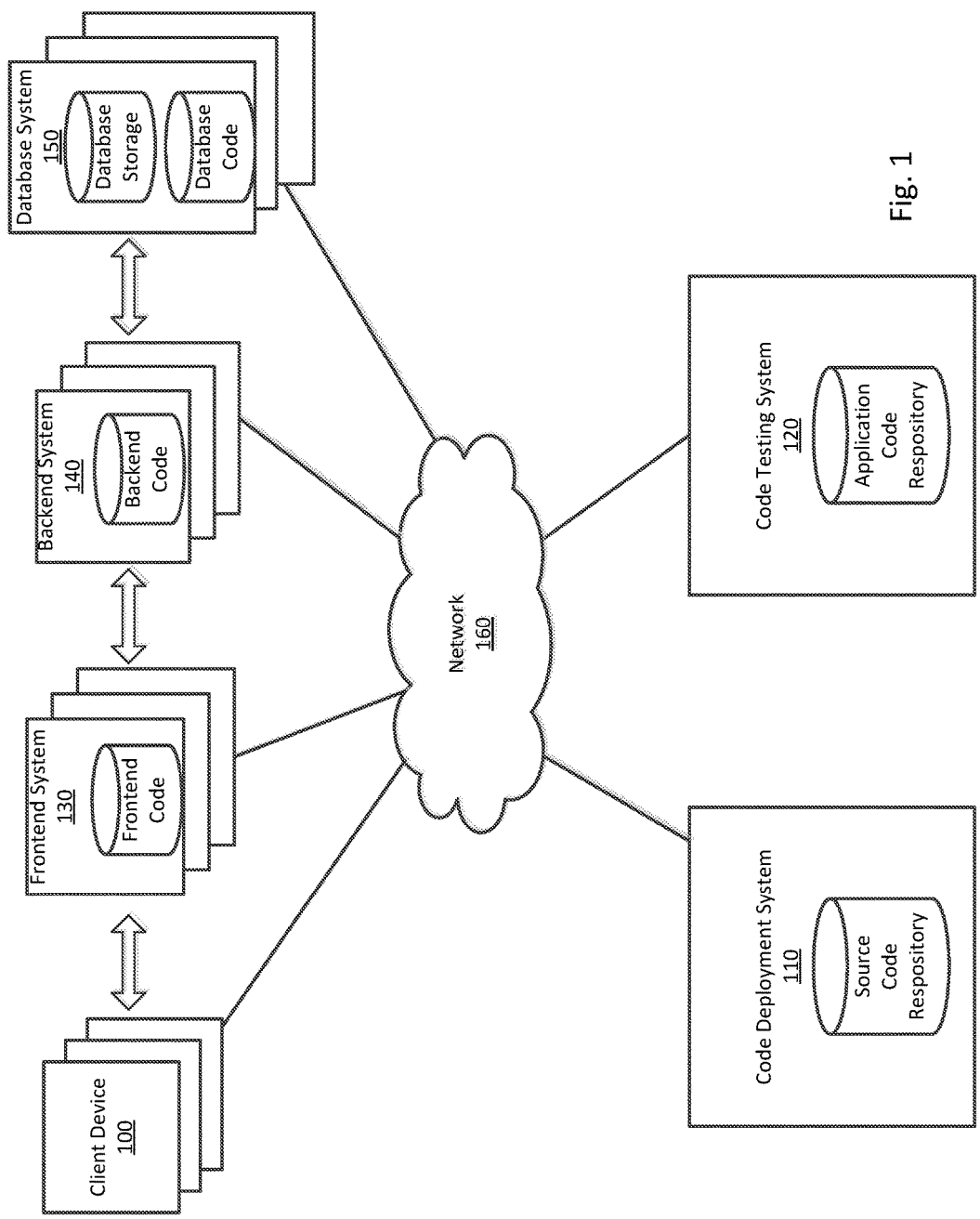
FIG. 1 shows an environment in which an application is tested and deployed according to one example embodiment.

FIG. 1 shows an environment in which an application is tested and deployed according to one example embodiment. In this example, an application is deployed to a set of systems including a frontend system 130, a backend system 140, and a database system 150. Applications may be distributed to any number of separate systems for providing services to various clients, for example to a user device 100. In this example, the set of systems represents various tiers of service for the application. In this example, the frontend system 130 receives a request from the user device 100, processes the request and provides a further request to the backend system 140, which itself may query a database system 150. Thus, as shown, each system within an application may query other systems to service original requests from a client device 100. The code deployment system 110 deploys code for the application to each of these systems, which may be correspondingly stored at each system.

In the example of FIG. 1, the user device 100 provides requests to the frontend system 130. In other examples, no user device 100 is included, and the frontend system 130 may execute the application without particular requests from any user device 100. In other examples, the user device 100 itself includes a portion of the application, for example a client-side process for a user to interact with a mobile device. When the user device 100 includes a portion of the application, the user device 100 may include code collection components, such as those shown in FIG. 2.

Application code that is loaded during operation of the application is termed "active code." From among the various files and classes in the application, only some of the application code for each tier may be loaded in execution of the application tier. In addition, the application may load additional libraries and other code that was not part of the deployed code, or dynamically generate code during the application's execution. The code identified as actually being loaded is the active code. When the systems execute the application code corresponding to each system, the systems monitor execution of the application code, identify active code during the execution, identify test code associated with the active code and provide the test code for testing by a code testing system 120.

As shown, in addition to the various tiers of service for the application (in this example, "frontend," "backend," and "database") there may be multiple systems providing services for each tier. For example, one tier may be a load balancer that identifies, from among a set of systems, which system will service a particular request to more evenly distribute the workload of servicing the requests. Each system that provides a different aspect or feature of the application is termed a "tier" herein for convenience, and in some examples does not represent a hierarchical relationship between different tiers. Rather, various "tiers" are used herein to indicate different services deployed to different systems or servers for performing part of the application deployed by the code deployment system 110. As an example, the tiers shown in FIG. 1 may apply to an application on the Internet, for example, to an application for serving webpages to a client device 100.

The application is a software application that is deployed via the code deployment system 110. The application may be developed and stored in a source code repository at the code deployment system 110. When the application is being deployed to each of the various tiers of the system, the code deployment system 110 may send the source code (in the case of an interpreted or scripted language) or may send a compiled version of the code for each tier to the respective systems for each tier. For example, the frontend code to the frontend system 130, backend code to the backend system 140, and database code to the database system 150. The application may be distributed as a package of files and modules. For example, the application may be distributed as a JAVA application for interpretation by a JAVA Runtime Environment in a JAVA Virtual Machine. The application, when deployed, may include a large number of files and modules, many of which may not be used in various circumstances encountered by a tier of the application. In addition, the application may invoke other packages, functions, or libraries during its execution. Continuing with the JAVA example, a distributed JAVA package may include many individual JAVA classes, not all of which may be invoked in various circumstances. While code in the JAVA language is discussed herein as an example, additional languages may also be used. In addition, the package may include code for generating dynamic code, for example as a script for execution in another language, or as an instruction to provide another system.

In addition to the application, each tier of the deployed system may run additional modules to analyze the application and provide test code to the code testing system 120 for static analysis. The code testing system 120 receives active code and stores the active code in an application code repository for analysis. In other embodiments, each tier of the application also includes a code analysis module to implement the code testing of code testing system 120. The code testing system 120 performs static analysis of the active code identified by each application tier. Static analysis includes methods and algorithms for deriving facts and heuristic inferences about computer programs without actually running those programs, for example by analysis of the code itself. That is, the static analysis provides analysis of source code, interpretable code (or script) or compiled executable code to identify various defects of the code, such as memory leaks, security vulnerabilities, and the like, which may be performed without executing the code itself. Because the code testing system receives the test code based on the active code from the various tiers, the static analysis is performed based on the code that was actually executing at the various application tiers, and may include dynamically generated code and exclude application code from the deployed code that was never loaded or run. The code deployment system 110 may also provide a copy of the deployed code for a tier to the code testing system 120 for comparison to the active code to identity which portions of the deployed code was active in the application tier.

Each of these various systems communicate via a network 160. The network 160 may be a wired or wireless communications network, and may include a combination of public and private networking channels. While shown as communicating through a single network 160, in practice various components may communicate via separate networks. For example, the database system 150 may be located on a private network with the backend system 140.

Figure 2:
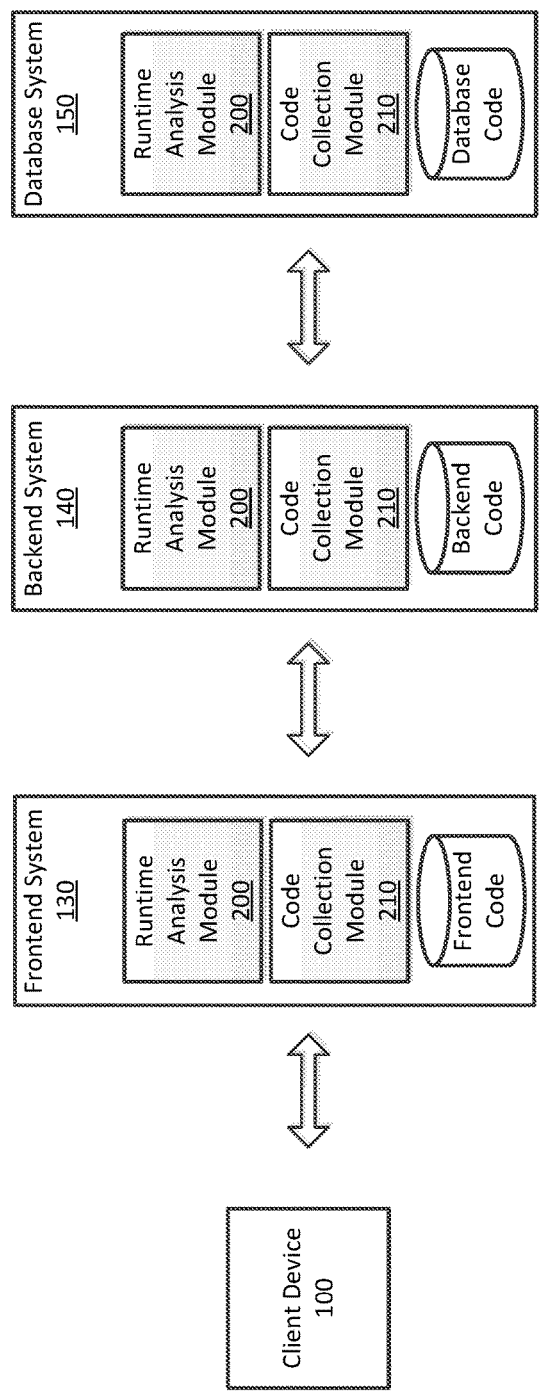
FIG. 2 illustrates application tiers with modules for identifying active code in an application according to one embodiment.

FIG. 2 illustrates application tiers with modules for identifying active code in an application according to one embodiment. In this example, each tier of the application includes a runtime analysis module 200 and a code collection module 210. These modules may be distributed as an agent that performs additional runtime analysis on the executing application, for example to provide dynamic analysis of the application and analyze behaviors and security vulnerabilities during execution. As further described below, these modules may also be implemented via a remote connection to the application tiers, rather than as an agent at the application tier. For convenience, a single system of each tier (i.e., frontend system 130, backend system 140, and database system 150) are shown in this example, though as shown in FIG. 1, several of each may be included in other examples. For convenience, the application tiers are shown in FIG. 2 along with a client device 100, while additional systems of FIG. 1 are not shown for clarity.

Each of the systems executes its respective application tier. That is, the frontend system 130 executes frontend code, the backend system executes backend code, and the database system executes database code, each received from and deployed by the code deployment system 110.

The runtime analysis module 200 analyzes the deployed application code at each tier to identify active code during execution of the application code. The runtime analysis module 200 may perform this analysis by monitoring execution of the application code and identifying loaded modules for the code as active code. To monitor the application code and identify modules loaded by the code, the runtime analysis module 200 may add hooks to the application prior to its execution, or may execute the application in a modified runtime environment that provides instrumentation to function calls internal or external to the application. In a JAVA-based application, such instrumentation may be provided using javaagent to provide instrumentation to executing functions.

The hooks added to an application may include adding breakpoints to the application for analysis by the external (to the application) runtime analysis module 200. When a breakpoint is reached by the executing application code, the application code pauses and the runtime analysis module 200 analyzes the state of the application code to determine the active code, for example by determining what libraries have been accessed, or what application classes have been loaded. This breakpoint analysis may be performed in one example via a debugger. In addition, any dynamically-generated code may also be determined. The breakpoints may be added to the application code at various points, for example at the end of each function executed by the application code, such that the application code may be analyzed prior to garbage collection of any loaded classes or other values scoped to that function.

In addition or as an alternative, the runtime analysis module 200 obtains information about the executing application by instrumenting function and library calls that the application requests external to the application's functions. For example, the application may request a library function to output data to a display, or the application may request an instantiation of a class that forms a part of a basic library for the language and is not included in a package of distributed application code. For example, in a JAVA application, classes appearing in the JAVA Class Library are typically distributed with the runtime environment, rather than being distributed with the application code. In additional configurations, the instrumentation may be applied to internal function calls as well, to identify functions with the application and functions what do not recite library or operating system calls.

To instrument these function and library calls, the runtime analysis module 200 may modify the library functions to add profiling of an application that calls the function (i.e., the application code). In this way, the application may execute within a modified runtime environment due to the modified library functions. The profiling may identify any loaded classes and report the loaded classes to the runtime analysis module 200 or to save a list of the loaded classes to a file for later use by the code collection module 210.

When the application is monitored by the runtime analysis module 200, any dynamically-generated code may also be identified and separately reported. This dynamically-generated code may be code generated by the application that is not itself specified in the deployed application code. For example, the dynamically-generated code may generate a script or a database access request. This dynamically-generated code may also be identified as active code for further analysis, which may be performed in a different language than the application code. In another example, the application may generate code in its own language, for example to analyze run-time characteristics of the program. In the JAVA example, the JAVA reflection classes may permit generation of JAVA code during execution of the application.

The runtime analysis module 200 may also identify requests to provide to the application during the monitoring and identification of active code. When the application is provided in a production environment, the runtime analysis module 200 monitors the application during normal operation as it receives and responds to normal requests. The runtime analysis module 200 may also apply a specific set of inputs to the application at that tier in order to simulate particular use cases. Use cases depend on the application, and may include, for example, creating a user account, accessing content at the database, and so forth. The runtime analysis module 200 may supply the set of inputs to the application and monitor the executing application as it applies the inputs. The active code identified by the runtime analysis module 200 may then be associated with that use case, rather than generally associated with the application as a whole. This may permit future analysis of the code results to be associated with that particular use case. When an application has an error when a particular use case occurs, a set of inputs may be generated for the use case and permit a developer to more easily identify which code is active and may be generating the error and identify errors from the analysis of that active code.

The code collection module 210 receives the list of active code and identifies a set of test code to test and reports the test code to the code testing system 120. The test code may be retrieved at the same time that the active code is identified by the runtime analysis module 200. In some circumstances, the test code is the active code. In other circumstances, the code collection module 210 includes additional code in addition to the active code, for example the package in which the active code is included may be identified and the entire package may be provided as test code. The active code may also be associated with a particular use case or set of inputs that identified the active code. As noted above, rather than reporting the collected code to the code testing system 120, a testing module may also be included at the application tier to analyze the active code and report the results to the code testing system 120 or code deployment system 110.

In some examples, the runtime analysis module 200 and code collection module 210 are added and execute to a test version of the application tier that does not receive inputs from normal users or requestors. In other examples, these modules are added to production versions of the application and may regularly execute along with the application at each application tier.

In another configuration, rather than adding the runtime analysis module 200 and code collection module 210 to the application tier, the functionality of these modules may be performed via a remote connection from another system. For example, the code testing system 120 may initiate a remote connection to an application tier and execute functionality of these modules via the remote connection to identify test code. In the remote connection, commands may be issued from a remote system (e.g., the code testing system 120), to identify executing applications and identify loaded modules. The executing applications are identified along with the active code, from which the test code may be retrieved as described above. This may vary depending on the operating system of the system providing the remote connection. For example, in a WINDOWS® operating system, the remote connection and analysis may be performed via Windows Management Instrumentation (WMI). In LINUX® this may be performed via the /proc/<id>/maps command, which may provide a mapping of virtual memory to a path and application using the virtual memory. Each of these permits identification of an executing program and its active code location, from which the remote connection may identify and retrieve test code.

Figure 3:
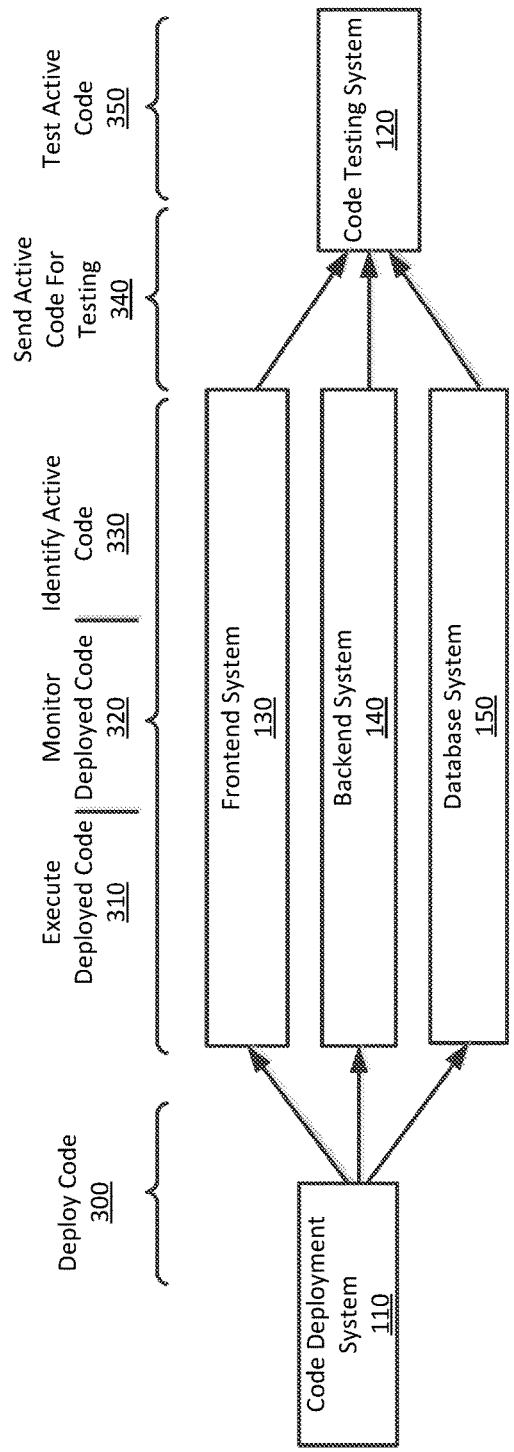
FIG. 3 illustrates an analysis flow for static analysis of active code, according to one embodiment.

FIG. 3 illustrates an analysis flow for static analysis of active code, according to one embodiment. As shown in FIG. 3, initially the deployment system 110 deploys 300 code to various application tiers, in this example to frontend system 130, backend system 140, and database system 150. As shown in FIG. 2, each of these systems may include a runtime analysis module 200 and a code collection module 210. At each of these systems, the application code received from the deployment system 110 is executed 310. When the application code is executed, the runtime analysis module 200 monitors the deployed code 320 and identifies 330 the active code. The active code may also be associated with the conditions under which the application executes, for example a set of inputs received by the application and a particular use case of the application. After identifying the active code at each of the application tiers, the active code is sent 340 for testing by the code testing system 120 that tests 350 the active code from each of the application tiers.

As shown in FIG. 3, each application tier may collect its own active code and provide the test code to the code testing system 120 for analysis. In an alternative example, each application tier may perform analysis on the active code and report the analysis results to the code testing system 120.

In one embodiment, the runtime analysis module 200 and code collection module 210 are automatically included with the deployed code. This permits the active code for an application to be collected from a large set of application tiers, and the static analysis for the active code to be performed for the various distributed systems on which the application operates.

In a further example, the use case for the application testing may be provided by the deployment system 110 when deploying the application code or otherwise designated to the application tiers. The use case may also include a set of inputs, for each application tier, that represent the specified use case. During execution of the application and related monitoring, additional inputs may also be generated and received by each application tier as the inputs are processed. For example, each application tier may interact with one another for implementing the requests made by the specified set of inputs. For example, the deployment system may specify a use of the frontend system for a user to create an account. This use case may include a set of inputs for the frontend system 130. As the frontend system 130 processes its inputs, it may issue related requests to the backend system 140, which itself may issue related requests to the database system 150. Each of these systems may be monitored to identify the active code 330 at each tier that is associated with fulfilling this request. In this way, the active code that may then be analyzed can be particularly associated with particular use cases and the code that is "exercised" by those inputs may be identified and provided for testing.

Figure 4:
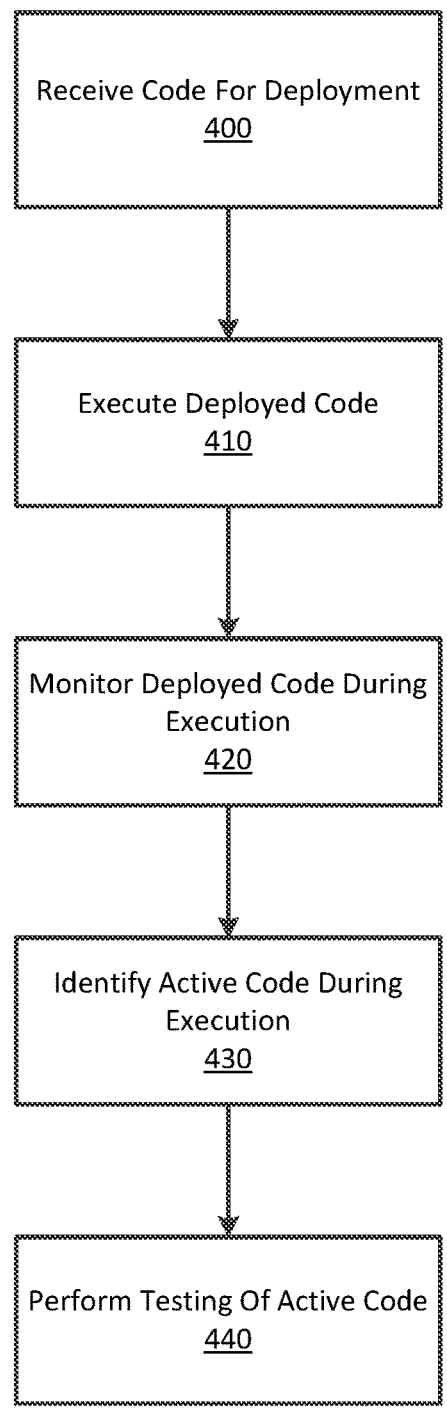
FIG. 4 illustrates an example process for identifying and analyzing active code for an application.

FIG. 4 illustrates an example process for identifying and analyzing active code for an application. This process may be performed, for example, by each system (i.e., application tier) executing the application. This example process may include additional or fewer steps as described above.

Initially, the application code is received 400 for deployment at the application tier. The deployed code is executed 410 and begins to run on the application tier. The application code may be modified, or executed in a modified runtime environment as noted above for the code to be monitored 420 during execution. As the application code executes, the monitoring identifies breakpoints or function calls at which the application code is monitored and active code is identified 430 in the application. After identification of the active code, the active code is tested using static analysis to determine static errors in the code that was actually used in the application and active during the monitoring.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for automated application testing of computer code comprising:
receiving deployed code of an application for execution at a computing system;
prior to executing the deployed code, adding breaking points to the deployed code;
executing the deployed code at the computing system;
during execution of the deployed code, monitoring the execution of the deployed code to identify active code from the deployed code, the identified active code loaded in a memory of the computing system for execution by the computing system during execution of the application, the identified active code including computer-executable instruction to be executed by the computing system;

sending the identified active code that is loaded in the memory of the computing system for executing by the computing system to a code testing module; and performing, by the code testing module, static analysis on the identified active code previously loaded in the memory of the computing system for execution by the computing system, the static analysis of the identified active code performed without executing the identified active code.

2. The method of claim 1, wherein the code is monitored during a set of input requests defining a use case for the application.

3. The method of claim 2, wherein the set of input requests are automatically generated.

4. The method of claim 1, wherein the monitoring comprises identifying active code when the breakpoints are reached in execution of the deployed code.

5. The method of claim 4, wherein the monitoring is performed by a separate process from the deployed code.

6. The method of claim 1, wherein monitoring the deployed code comprises instrumenting function calls of the deployed code.

7. The method of claim 6, wherein the function calls comprise library or system functions.

8. The method of claim 1, wherein the deployed code is a portion of the code for an application and other deployed code is provided to another system that identifies test code for the other system.

9. The method of claim 1, wherein the monitoring of the deployed code is performed via a remote connection by another computing system.

10. A non-transitory computer-readable medium comprising instructions that, when executed by a processor, cause the processor to perform steps of:

receiving deployed code of an application for execution at a computing system;

prior to executing the deployed code, adding breaking points to the deployed code;

executing the deployed code at the computing system;

during execution of the deployed code, monitoring the execution of the deployed code to identify active code from the deployed code, the identified active code loaded in a memory of the computing system for execution by the computing system during execution of the application, the identified active code including computer-executable instruction to be executed by the computing system;

sending the identified active code that is loaded in the memory of the computing system for executing by the computing system to a code testing module; and performing, by the code testing module, static analysis on the identified active code previously loaded in the memory of the computing system for execution by the computing system without executing the identified active code.

11. The non-transitory computer-readable medium of claim 10, wherein the code is monitored during a set of input requests defining a use case for the application.

12. The non-transitory computer-readable medium of claim 11, wherein the set of input requests are automatically generated.

13. The non-transitory computer-readable medium of claim 10, wherein the monitoring comprises identifying active code when the breakpoints are reached in execution of the deployed code.

14. The non-transitory computer-readable medium of claim 13, wherein the monitoring is performed by a separate process from the deployed code.

15. The non-transitory computer-readable medium of claim 10, wherein monitoring the deployed code comprises instrumenting function calls of the deployed code.

16. The non-transitory computer-readable medium of claim 15, wherein the function calls comprise library or system functions.

17. The non-transitory computer-readable medium of claim 10, wherein the deployed code is a portion of the code for an application and other deployed code is provided to another system that identifies test code for the other system.

18. The non-transitory computer-readable medium of claim 10, wherein the monitoring of the deployed code is performed via a remote connection by another computing system.

* * * * *